United States Patent
Grab et al.

(10) Patent No.: US 8,079,275 B2
(45) Date of Patent: Dec. 20, 2011

(54) SHAFT ARRANGEMENT HAVING A ROLLING BEARING

(75) Inventors: Harald Grab, Heidenfeld (DE); Michael Pausch, Oberwerrn (DE)

(73) Assignee: Schaeffler KG, Herzogenaurach (DE)

(*) Notice: Subject to any disclaimer, the term of this patent is extended or adjusted under 35 U.S.C. 154(b) by 3 days.

(21) Appl. No.: 12/595,664

(22) PCT Filed: Apr. 9, 2008

(86) PCT No.: PCT/DE2008/000601
§ 371 (c)(1),
(2), (4) Date: Nov. 13, 2009

(87) PCT Pub. No.: WO2008/125083
PCT Pub. Date: Oct. 23, 2008

(65) Prior Publication Data
US 2010/0043570 A1    Feb. 25, 2010

(30) Foreign Application Priority Data
Apr. 14, 2007   (DE) .................. 10 2007 017 705

(51) Int. Cl.
*G01L 3/00*   (2006.01)
(52) U.S. Cl. .................................. 73/862.335
(58) Field of Classification Search ....... 73/862.331–862.338
See application file for complete search history.

(56) References Cited

U.S. PATENT DOCUMENTS

| | | | |
|---|---|---|---|
| 4,732,494 A * | 3/1988 | Guers et al. | 384/448 |
| 4,875,785 A * | 10/1989 | Santos et al. | 384/448 |
| 5,026,178 A * | 6/1991 | Ballhaus | 384/448 |
| 5,130,650 A * | 7/1992 | Lemarquand | 324/207.22 |
| 5,289,120 A * | 2/1994 | Moretti et al. | 324/174 |
| 6,100,809 A * | 8/2000 | Novoselsky et al. | 340/682 |
| 6,163,148 A * | 12/2000 | Takada et al. | 324/226 |
| 6,237,428 B1 | 5/2001 | Odachi et al. | |
| 6,260,422 B1 | 7/2001 | Odachi et al. | |
| 6,370,967 B1 | 4/2002 | Kouketsu | |
| 6,412,356 B1 | 7/2002 | Kouketsu et al. | |
| 6,595,073 B1 | 7/2003 | Yagi et al. | |
| 6,975,196 B1 | 12/2005 | Laidlaw | |
| 7,249,891 B2 * | 7/2007 | Aoki et al. | 384/448 |
| 7,307,414 B2 * | 12/2007 | Ito | 324/174 |
| 2005/0117825 A1 | 6/2005 | Goto et al. | |
| 2006/0137475 A1 | 6/2006 | Varonis | |
| 2007/0022809 A1 | 2/2007 | Yoshida et al. | |

FOREIGN PATENT DOCUMENTS

| | | |
|---|---|---|
| DE | 4318147 Y | 12/1993 |
| DE | 10161803 Y | 7/2003 |
| DE | 102005006769 | 8/2006 |
| DE | 102005010338 | 9/2006 |
| DE | 69834528 | 11/2006 |
| EP | 0523025 | 1/1993 |
| EP | 1046893 | 10/2000 |
| EP | 1621858 | 2/2006 |

(Continued)

*Primary Examiner* — Lisa Caputo
*Assistant Examiner* — Octavia Davis
(74) *Attorney, Agent, or Firm* — Lucas & Mercanti, LLP

(57) ABSTRACT

A shaft arrangement, with a rotatable shaft supported in a rolling bearing, which has rolling elements and an outer race, a torsion sensor having a permanently magnetic ring and at least one magnetic field sensor fastened to a fixed sensor bracket attached to the outer race being provided. A torsion sensor can hereby be integrated in a rotating bearing in a simple design.

19 Claims, 2 Drawing Sheets

FOREIGN PATENT DOCUMENTS

| | | |
|---|---|---|
| EP | 1626260 | 2/2006 |
| EP | 1635079 | 3/2006 |
| JP | 2001033322 | 2/2001 |
| WO | 00/58704 A1 | 10/2000 |
| WO | 03/102524 A | 12/2003 |
| WO | 03/102524 X | 12/2003 |

* cited by examiner

SHAFT ARRANGEMENT HAVING A ROLLING BEARING

FIELD OF THE INVENTION

This application is a 371 of PCT/DE2008/000601 filed Apr. 9, 2008, which in turn claims the priority of DE 10 2007 017 705.6 filed Apr. 14, 2007, the priority of both applications is hereby claimed and both applications are incorporated by reference herein.

The invention is in the field of mechanical engineering, more specifically in the field of the transmission of mechanical movements by means of shafts which are usually mounted in rolling bearings.

BACKGROUND OF THE INVENTION

Corresponding shafts and bearings are found in many different forms, especially in transmissions, but also in simple motor drives and generators.

What is often important for operating a machine is the particular torque which is transmitted at the moment by a drive shaft. This is expedient, for example, in order to control output, to limit mechanical loads, to minimize wear and to reduce risks of damage.

Torsion sensors are already known for this purpose from the prior art and are based on various technologies.

DE 69834528 P2 discloses a magnetostrictive torque sensor, in which a magnetostrictive ring consisting particularly of a composite material based on rare-earth, iron or similar alloys is attached onto or inserted into a shaft. In the torque-free state, an azimuthally revolving magnetic field prevails within the ring and is disrupted by torque being introduced, thus giving rise to a resulting axial magnetic field as an indicator of the torque.

DE 102005006769 A1 shows, in general, as a reversal of magnetostriction, the Villary effect, as it is known, by means of which deformation, for example torsion of a shaft, gives rise to a magnetic action of the shaft. Materials exhibiting a Villary effect which are mentioned are iron, copper, nickel or alloys of these metals.

DE 102205010338 A1 discloses a force sensor arrangement, with magnetostrictive resistance sensors, an inhomogeneous layer sequence of magnetic layers being provided, on which a magnetostrictive action is exerted. An electrical resistance is subsequently measured in the overall arrangement as a measure of deformation.

Japanese patent abstract no.: 2001033322 A discloses a rolling bearing, on the inner ring of which magnetostrictive elements are arranged, magnetic sensors being provided on the inside of the outer ring of the bearing. The torque acts on the elements in the bearing inner ring and is thus intended to cause a change in the magnetic conditions.

EP 1046893 B1 basically discloses the use of the magnetostrictive effect for torque measurement and the fastening of a magnetostrictive ring element on a shaft for transmitting the torque and for utilizing the effect. However, this does not describe any structure directly related to the set-up of a rolling bearing into which a torque sensor is integrated. For measuring the magnetic field, a special sensor is described by means of which a saturation magnetization of a probe is measured with high frequency in various magnetization directions, with the result that the magnetic field, as a result of the magnetostrictive element, can be measured exactly.

Against this background, the set object of the present invention is, for a shaft arrangement with a rotatable shaft which is mounted in a rolling bearing with rolling bodies and with an outer ring, to carry out torsion measurement in as space-saving a way as possible and especially simply in structural terms.

SUMMARY OF THE INVENTION

According to the invention, the object is achieved by a torsion sensor which has a permanent magnetic ring fixedly connected to the shaft and at least one magnetic field sensor fastened to a stationary sensor carrier connected to the outer ring.

Basically, the design of a torsion sensor on a shaft, utilizing the magnetostrictive effect, is known. According to the present invention, this effect is integrated into a rotary bearing in an optimized and space-saving way. Consequently, there is no need for a separate holder for the sensor, and the latter can be produced and mounted together with the parts of the rotary bearing. In this case, the other parts of the bearing, which later are located in the immediate vicinity of the torsion sensor, can be inspected and, as early as during production, tested to ascertain whether unwanted magnetic effects influence the measuring accuracy.

The invention may advantageously be refined in that the sensor carrier surrounds the shaft annularly and carries the magnetic field sensor or magnetic field sensors on its inside.

Consequently, the sensor carrier can shield the magnetic field sensor or magnetic field sensors outwards mechanically and protect against unwanted influences from outside. The sensor or sensors can then lie opposite the corresponding permanent magnetic ring directly on the inside of the sensor carrier.

The design becomes especially simple if the sensor carrier forms an extension of the outer ring in the axial direction of the shaft. For example, the outer ring can simply be extended axially in order to form the raceway for rolling bodies in a first region and the sensor carrier in a second region offset axially with respect to the first region.

The magnetic field sensors may in this case either be fastened to the sensor carrier on the inside by adhesive bonding or else be embedded in recesses. It is essential that the material of the sensor carrier should be selected such that no magnetic interaction with the magnetic field sensors occurs. For this purpose, the sensor carrier may consist of a magnetically shielding material.

The sensor carrier may also be connected to the outer ring by means of a cylindrical sleeve.

In this case, the sensor carrier may, for example, be attachable, solderable or weldable to the outer ring by means of the sleeve.

The sensor carrier may also be formed by a sleeve which are attachable onto the outer ring.

By means of the designs mentioned, in any event, use may advantageously be made of the fact that the outer ring carries the sensor carrier and there is therefore no need for a further carrying structure for the sensor carrier.

In the configuration of the permanent magnetic magnetostrictive ring, it is important that this participates in a torsion of the shaft. For this purpose, there may advantageously be provision for the permanent magnetic ring to be fastened on the surface area of the shaft in the region of the sensor carrier.

In this case, the permanent magnetic ring may be connected positively to the shaft. This may be ensured, for example, by means of a toothing, a tongue-and-groove joint or similar configurations of the ring and shaft engaging geometrically one in the other.

For the fixed connection between the shaft and the permanent magnetic ring, a nonpositive connection may also be provided, for example by the ring being shrunk on.

A materially integral connection by soldering on or welding on and also by adhesive bonding may also be envisaged.

Finally, the permanent magnetic ring may even be integrated into the shaft in that it is either inserted in a recess of the shaft or it is formed in one piece therewith as part of the shaft. This may be ensured, for example, in that the shaft consists in sections of different materials, the ring being provided of permanent magnetic material, or in that the shaft is partially magnetized in the region of the ring and is otherwise not magnetized.

For a structurally simple set-up of the arrangement according to the invention, it is also conceivable that the permanent magnetic ring is designed as an axial extension of the inner ring of the bearing, in so far as such is provided and the inner raceway of the rolling bodies is not formed by the surface area of the shaft itself. In this case, the overall sensor arrangement, together with the magnetic field sensors and the permanent magnetic ring, may be integrated completely into components of the rotary bearing.

The functioning of the invention is shown to be such that, in the torque-free state of the shaft, the magnetic flux runs annularly, without interruption, through the permanent magnetic ring in the circumferential direction, so that no magnetic actions arise outwardly.

This is ensured by appropriate magnetization during construction or when the arrangement is set.

If, then, a torsion is introduced into the shaft and is shared with the permanent magnetic ring, the, in particular, anisotropic magnetostrictive effect gives rise to disruptive deviating magnetic flux elements in which, in particular, the direction of the flux deviates from the circumferential direction and, overall, an axial component of the magnetic flux can arise in the axial direction of the shaft. The result of this, since the magnetic flux is not closed within the ring in this direction, is that magnetic field components or flux lines pass outward and can be detected in the magnetic field sensors. The corresponding sensors may be designed, for example, as Hall sensors or in the form of simple magnetic measuring coils or may utilize some other known magnetic effect. Since no field strength is measurable in the normal state, the magnetic field sensors can be set to high sensitivity and can therefore detect even low torsional moments.

Basically, a multiplicity of methods for magnetization may be used in the preparation or magnetization of the permanent magnetic ring. It became apparent in this case that an advantageous method is to feed a current of high current strength through a conductor which passes through the ring and which can generate a corresponding magnetic field of high strength which is directed in the desired circumferential direction and by means of which permanent magnetization can be ensured in suitable materials.

BRIEF DESCRIPTION OF THE DRAWINGS

The invention is shown below in a drawing and then described by means of an exemplary embodiment. In the drawing.

DETAILED DESCRIPTION OF THE INVENTION

Figure 1:
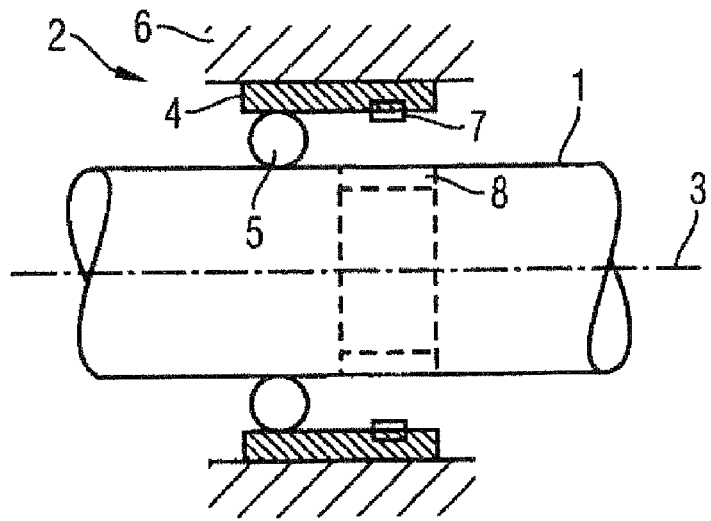
FIG. 1 shows a first shaft arrangement according to the invention.

FIG. 1 shows, in a partially sectional arrangement, a shaft 1, for example made from steel, which is mounted rotatably about the axis 3 in a rotary bearing 2. The bearing 2 has an outer ring 4 which has a raceway for rolling bodies 5, balls in the present case. The raceway of the outer ring 4 may, like the surface of the balls 5, be hardened or have tribologically beneficial coating.

The inner raceway for the bearing balls 5 is afforded by the surface of the shaft 1, which may have a running groove.

The outer ring 4 is held in a supporting body 6 which is afforded by the construction of the machine which contains the shaft 3.

The outer ring is extended in the axial direction of the axis 3 beyond the region in which the balls are located and there, on its inner surface area, carries the magnetic field sensors 7, of which, for example, two may be distributed on the circumference of the outer ring 4. These magnetic field sensors 7 are designed, for example, as Hall sensors or simply as wound electrical coils, if appropriate, filled with a ferromagnetic material. They are oriented in such a way that they can detect axial components of a magnetic field with respect to the axis of the shaft.

Further, a permanent magnetic ring 8 may be gathered from FIG. 1, which forms part of the shaft 1 and which lies on the circumferential surface area of the latter.

In the permanent magnetic ring 8, a magnetic flux prevails, which revolves azimuthally on the circumference of the shaft and is closed within the ring, so that virtually no magnetic field components pass outward.

In this state, the magnetic field sensors 7 detect no axial component of the magnetic field emanating from the ring 8.

When the shaft 1 undergoes torsion, this gives rise, as a consequence of the torsion of the permanent magnetic ring 8, especially when an anisotropic magnetostrictive property is presumed, to a disruption of the magnetic flux there, with axial magnetic field components being generated. This effect is dealt with in more detail further below. In any event, in this case, the magnetic field sensors detect an axial magnetic field component outside the permanent magnetic ring 8 as a stray field, from which the torsion of the shaft and, with respect to the magnetic field strength, also the amount of torsion can be inferred.

Figure 2:
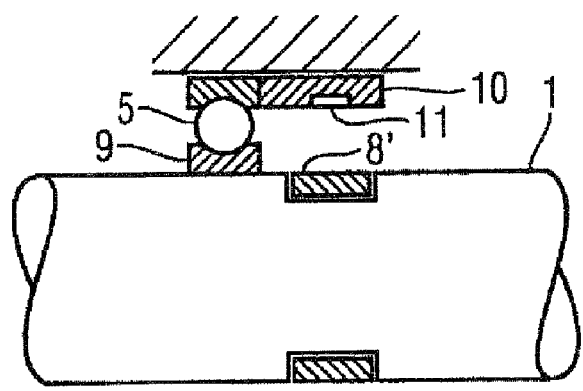
FIG. 2 shows a second shaft arrangement.

FIG. 2 shows another embodiment of a shaft arrangement according to the invention with a shaft 1, into which a separate body 8' is embedded on the circumference in such a way that said body is flush with the outer surface area of the shaft 1. The permanent magnetic ring 8' is firmly glued, for example, in a groove of the shaft 1. Said ring may be interrupted at one point on its circumference so that it can be snapped on resiliently.

The rotary bearing differs from the rotary bearing shown in FIG. 1 in that an inner ring 9, too, is provided, which is fastened on the shaft 1 and affords a raceway for the balls 5.

Moreover, the outer ring is divided in the axial direction, and the extension 10 of the outer ring has recesses 11, in which the magnetic field sensors are accommodated. So as not to disturb the magnetic field measurement, the extension 10 should consist of a magnetically inert material. It may consist, for example, of a magnetically shielding material.

Figure 3:
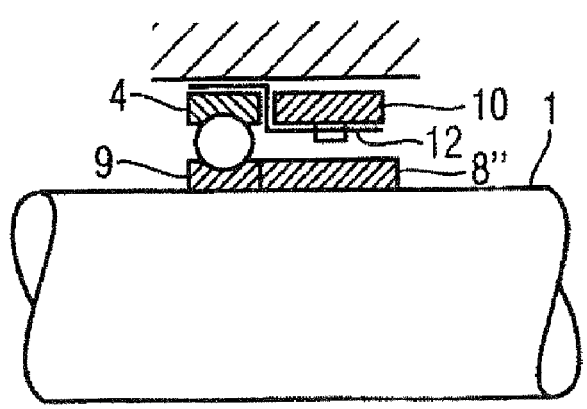
FIG. 3 shows a third shaft arrangement according to the invention.

FIG. 3 illustrates a further, somewhat modified version of the invention, the permanent magnetic ring 8" being designed as an axial extension of the inner ring 9 of the bearing. The permanent magnetic ring 8" is welded, soldered or adhesively bonded or attached positively or nonpositively onto the shaft 1.

The actual bearing is formed by the inner ring 9, the outer ring 4 and the balls 5, the sensor carrier 10 being firmly clamped on the outer ring 4 by means of a sleeve 12. As a result, the sensor carrier may also be introduced after the rotary bearing has been set up.

The sensor carrier 10 in this case carries the magnetic field sensors which oppose the permanent magnetic ring 8" in order to measure axial magnetic field components.

As in FIG. 2, the bearing arrangement is omitted in the lower part of FIG. 3 for the sake of clarity.

Figure 4:
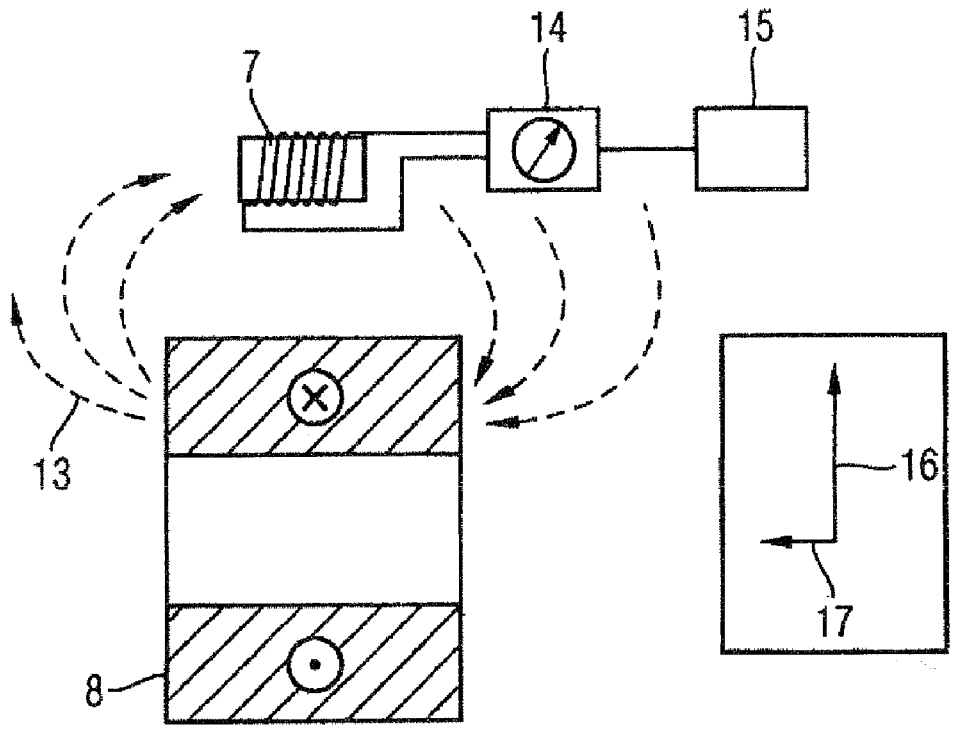
FIG. 4 shows a measuring arrangement for detecting the magnetic field.

FIG. 4 shows the basic functioning of the measuring arrangement.

The permanent magnetic ring 8 is illustrated schematically in section, with the magnetic flux lines which project out of the drawing plane on the lower side and project into the drawing plane in the upper part.

If, then, a torsion is introduced, an axial component of the magnetic field arises, leading to a stray field which is illustrated by the dashed lines 13. The stray flux is closed by the air gap and at the same time also penetrates the magnetic field sensors 7, one of which is illustrated schematically by a coil with terminals.

The terminals of the coil are connected to an ammeter 14 which delivers a measurement signal proportional to the magnetic field strength. This measurement signal can still be corrected by means of various effects, for example in order to rule out influences of the earth's magnetic field, and subsequently the result can be converted to the amount of torsion and indicated in a computing and indicator unit 15.

The right part of the figure shows, next to the section of the permanent magnetic ring 8, a side view of the ring, with the magnetic flux component 16 directed in the circumferential direction of the ring and with the axially directed component 17 which occurs when a torsional moment is applied.

Since axial flux components of this kind cannot be closed within the material, the stray fluxes illustrated above arise.

Figure 5:
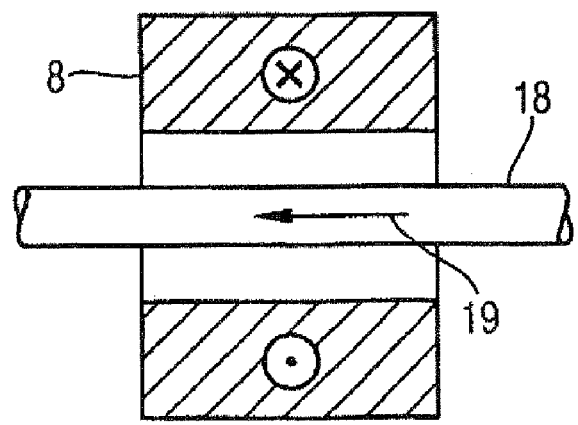
FIG. 5 shows a configuration for the magnetization of the permanent magnetic ring.

FIG. 5 shows a typical arrangement for generating permanent magnetization in a permanent magnetic ring 8, a conductor 18, merely being indicated schematically, having flowing through it in the direction of the arrow 19 a high current of high current strength, for example a pulse-like current, said conductor generating, by virtue of Ampere's law a magnetic flux which surrounds the conductor circularly and which leads to a corresponding retentivity in the ring 8.

Such a procedure is also appropriate, for example, in the case of a shaft into which a corresponding ring 8 is integrated, the shaft then being utilized as a conductor. In this case, the ring 8 may also be implemented as a coating with a ferromagnetic material in the region of the shaft. Such a coating can also be applied, for example, by electroplating or by vapor deposition.

In summary, it can be stated that, by means of the invention, a structurally simple and cost-effective solution for a torsion sensor is afforded by the integration of a torsion sensor into a bearing.

LIST OF REFERENCE SYMBOLS

1 Shaft
2 Rolling bearing
3 Axis
4 Outer ring
5 Rolling body
6 Supporting body
7 Magnetic field sensor
8, 8', 8" Permanent magnetic ring
9 Inner ring
10 Sensor carrier, extension
11 Recess
12 Sleeve
13 Magnetic field lines
14 Ammeter
15 Indicator unit
16 Circumferentially directed flux component
17 Axial component
18 Conductor
19 Arrow

The invention claimed is:

1. A shaft arrangement, comprising:
a rotatable shaft;
a rolling bearing ring having an inner ring fastened on a circumference of the shaft, an outer ring spaced from and opposing the inner ring and rolling bodies arranged between the outer ring and the inner ring;
a stationary sensor carrier connected to the outer ring and having a recess;
a torsion sensor having at least one magnetic-field sensor and a permanent magnetic ring, the permanent magnetic ring being fixedly connected to the shaft, and the magnetic-field sensor being fixed in the recess of the stationary sensor carrier of the outer ring.

2. The shaft arrangement of claim 1, wherein the sensor carrier, which has an inside face, surrounds the shaft annularly and the recess is on the inside face.

3. The shaft arrangement of claim 2, wherein the sensor carrier forms an extension of the outer ring in an axial direction of the shaft.

4. The shaft arrangement of claim 3, wherein the outer ring carries the sensor carrier.

5. The shaft arrangement of claim 1, wherein the permanent-magnetic ring is fastened on a surface area of the shaft in a region of the sensor carrier.

6. The shaft arrangement of claim 5, wherein the permanent magnetic ring is connected non-positively to the shaft.

7. The shaft arrangement of claim 5, wherein the permanent magnetic ring is positively connected to the shaft.

8. The shaft arrangement of claim 1, wherein the permanent magnetic ring is connected to an axial extension of the inner ring of the bearing or is integrated in the inner ring.

9. The shaft arrangement of claim 1, wherein the permanent magnetic ring is formed as part of the shaft, in one piece with the shaft.

10. A method for producing a shaft arrangement of claim 1, wherein magnetization of the permanent magnetic ring is achieved by pulsed generation of an electrical current passing through the ring.

11. The shaft arrangement of claim 1, wherein the shaft has a recess in which the permanent magnetic ring is embedded.

12. The shaft arrangement of claim 1, wherein the permanent magnetic ring has a circumference which is interrupted at one point so as to allow the permanent magnetic ring to be snapped on the shaft resiliently.

13. A shaft arrangement, comprising:
a rotatable shaft;
a rolling bearing having an inner ring mounted on a circumference of the shaft, an outer ring spaced from and opposing the inner ring and rolling bodies arranged between the outer ring and the inner ring;
a stationary sensor carrier arranged axially spaced from the outer ring;

a cylindrical sleeve having a first segment extending axially above the outer ring, a second segment extending from the first segment radially between the outer ring and the stationary sensor carrier and a third segment extending axially from the second segment, in a direction opposite the first segment, beneath the stationary sensor carrier with the stationary sensor carrier firmly connected to the outer ring by the sleeve; and a torsion sensor having at least one magnetic-field sensor and a permanent magnetic ring, the magnetic field sensor, which opposes the permanent magnetic ring, is carried by the stationary sensor carrier and the permanent magnetic ring is an axial extension of the inner ring.

14. A shaft arrangement, comprising:

a rotatable shaft;

a rolling bearing ring having an inner ring fastened on a circumference of the shaft, an outer ring spaced from and opposing the inner ring and rolling bodies arranged between the outer ring and the inner ring;

a stationary sensor carrier connected to the outer ring;

a torsion sensor having at least one magnetic-field sensor and a permanent magnetic ring, the permanent magnetic ring being fixedly connected to the shaft, and the magnetic-field sensor being fastened to the stationary sensor carrier of the outer ring, wherein the sensor carrier, which has an inside face, surrounds the shaft annularly and carries the magnetic-field sensor or magnetic-field sensors on the inside face, wherein the sensor carrier forms an extension of the outer ring in an axial direction of the shaft, and wherein the sensor carrier is connected to the outer ring by means of a cylindrical sleeve.

15. The shaft arrangement of claim 14, wherein the cylindrical sleeve has a first segment extending axially above the outer ring, a second segment extending from the first segment radially between the outer ring and the stationary sensor carrier and a third segment extending axially from the second segment, in a direction opposite the first segment, beneath the stationary sensor carrier with the stationary sensor carrier firmly connected to the outer ring by the sleeve.

16. A method for producing a shaft arrangement of claim 14, wherein magnetization of the permanent magnetic ring is achieved by pulsed generation of an electrical current passing through the ring.

17. The shaft arrangement of claim 14, wherein the outer ring carries the sensor carrier.

18. The shaft arrangement of claim 14, wherein the permanent-magnetic ring is fastened on a surface area of the shaft in a region of the sensor carrier.

19. The shaft arrangement of claim 14, wherein the permanent magnetic ring is connected to an axial extension of the inner ring of the bearing or is integrated in the inner ring.

* * * * *